United States Patent [19]

Vollman

[11] Patent Number: 4,514,273
[45] Date of Patent: Apr. 30, 1985

[54] APPARATUS FOR STIMULATING REMOVAL OF ELECTROLYTIC ENERGY FROM FLUIDS

[75] Inventor: Leonard L. Vollman, St. Louis County, Mo.

[73] Assignee: Scale Free Systems, Inc., St. Louis, Mo.

[21] Appl. No.: 578,271

[22] Filed: Feb. 8, 1984

[51] Int. Cl.³ .................. C23F 13/00; H05F 3/02
[52] U.S. Cl. .................. 204/196; 204/279; 204/286; 219/312; 361/222
[58] Field of Search .............. 204/196, 286, 279, 147, 204/288, 289; 219/312, 319; 361/220, 222

[56] References Cited

U.S. PATENT DOCUMENTS

| | | | |
|---|---|---|---|
| 2,499,670 | 3/1950 | Neeley | 204/196 X |
| 4,136,001 | 1/1979 | Nozaki | 204/196 |
| 4,147,607 | 4/1979 | Vollman | 204/147 X |
| 4,434,039 | 2/1984 | Baboian et al. | 204/196 |
| 4,436,604 | 3/1984 | Walters et al. | 204/196 |

*Primary Examiner*—Donald R. Valentine
*Attorney, Agent, or Firm*—Paul M. Denk

[57] ABSTRACT

An apparatus for stimulating removal of electrolytic energy from fluids, including a probe-like member incorporating a tube of length for extending into the hot water heater or other vessel, a mounting member provided at one end of the tube for securing with the vessel, the tube being formed of conductive material, and a rod secured onto the surface of the tube, extending longitudinally thereof, preferably in a helical pattern, and with both said rod and tube being formed of conductive material for eliminating electrostatic or electrolytic charge from the water within the vessel; a modification incorporates a tube having a pair of spacers provided proximate each end, for elevating the tube from any surface upon which it rests, the spacers being of nonconductive material, the tube being of conductive material, and having a sleeve provided at one end so that a series of said tubes can be secured together for extension of the conductive member in dependence upon the size of the water handling equipment being treated through application of this invention.

17 Claims, 6 Drawing Figures

APPARATUS FOR STIMULATING REMOVAL OF ELECTROLYTIC ENERGY FROM FLUIDS

CROSS-REFERENCE TO RELATED PATENT

Applicant herein is the inventor of the invention and patent pertaining to Improved Apparatus for Stimulating Removal of Electrolytic Energy from Fluids, U.S. Pat. No. 4,147,607, and owned by common assignee.

BACKGROUND OF THE INVENTION

This invention relates generally to water treatment equipment, but more particularly pertains to an improved means for effectively removing electrolytic energy from within a vessel of water, or the like, such as an industrial or domestic water heater, and which normally can lead to mineral deposits upon the internal conductive surfaces inherently within such equipment, or the piping connecting therewith.

The deposit of mineral material upon metallic or other surfaces, generally conductive surfaces, located within water handling and treating equipment has long been a problem associated with this particular art. The existance of mineral trace elements within water, or other fluids, that are being treated by the aforesaid type of equipment has long plagued the industry. In fact, what has been experienced by the applicant, is that tubes or piping that connect with water handling and treating equipment, and particularly hot water boilers, can lead, within a relatively short period of time, to calcium and other mineral deposits that substantially block or very nearly curtail the flow of water therethrough, and thereby substantially decrease the efficiency of operation of such equipment. It is believed that mineral deposits occur as a result of electrolytic action that does take place within the water processing equipment, and the fact that such mineral deposition takes place can be readily deduced from observing the interior of any pipe that is constructed of iron, copper, or any other conductive material, wherein the mineral deposits that uniformly form a scale around the entire inner circumference of the pipe can be readily seen.

The pipes alone, as connected to the water handling equipment, are not only attacked by mineral deposits, but in addition, any type of apparatus that requires the use of water or other conductive liquid are subjected to such deterioration. Boilers, water heaters, condensors, bottle washers, pasteurizers, water coolers, and related equipment, are all of the type of equipment that can be subject to the formation of scale upon their inner surfaces, as below the waterline, particularly if these apparatuses are formed of a conductive material.

But, it has been found, as so fully explained in my prior U.S. Pat. No. 4,147,607, as previously alluded to, that the provision of some means within the flow of water within these types of apparatuses can effectively ground or diminish the electric charge within such water, and can significantly reduce the damage heretofore sustained by such water handling apparatuses. And, as is now known, formation of scale itself upon the inner surfaces of water treating apparatuses is not in and of itself the only damage perpetrated by this action, but that scale formation also can give rise to pitting and other deteriorations at the scale-metal interface, with corrosion of the metallic surface eventually occurring. This generally is one of the main causes that gives rise to the demise of water heaters, wherein internal corrosion of the heater, and particularly that surface that is exposed to the water, eventually corrodes to the point of failure.

Numerous various types of water treating equipment are generally known in the prior art, and have functioned to some extent effectively for achieving mineral deposit and scale reduction, but many of these devices have not given recognition to the need to obtain the most effective removal of electrostatic charge, and such can be readily seen in the prior U.S. Pat. No. 2,499,670, to Neeley, wherein the electrode itself connects through supporting structure to the outer sheet of the boiler, and hence, any grounding achieved in this manner has reduced benefits on the formation of scale upon the inner surfaces of the shown boiler. The earlier patents, in the United States to Bremerman, U.S. Pat. Nos. 2,893,938, 2,975,769, 3,595,774, and 3,620,951, have recognized the necessity to insulate the electrode from the reservoir surface so that a more effective grounding of the electrode can be made. One problem, though, with these Bremerman style of devices is that his mounting component usually was constructed of a Bakelite material, or some other form of resin insulator, and such insulators have been found to exhibit the tendency to absorb moisture and eventually weaken the insulator causing grounding through itself. Thus, such prior art electrodes, while being effective in their early stages of usage, eventually become self-deteriorated due to their prolonged exposure to the moisture within the vessel, and thus eventually and substantially decrease in their efficiency of operation.

My earlier invention discloses the probe-type style of insulated grounding means that inserts within the vessel of water, and also, shows the tube-style of lay-in unit that works rather effectively within cooling towers, or the like, and function therein to ground the static electrical charge from within the moisture and water contained and passing through such apparatuses. The general object of this current invention is to add to the efficiency of operation of my prior apparatuses, and to more effectively eliminate that static electrical charge contained within the fluids passing through the water handling equipment.

It is, therefore, the principal object of this invention to provide a more efficiently and effectively operating grounding apparatus for the removal of electrostatic charge and electricity from the water passing through water handling equipment.

A further object of this invention is to provide a conductor formed as a probe and which incorporates increased surface area for contact with the water passing through the apparatus, and in addition, disposes this increased area in a manner that stimulates and encourages a greater quantity of the water to circulate around the grounding probe in order to more effectively remove electrolytic energy from the vessel.

A further object of this invention is to provide a grounding probe that extends within a vessel of water, having increased surface area that is helically wound in the form of a rod around the surface and along the length of the grounding probe, in order to stimulate greater water circulation around the probe during its flow through the water handling equipment.

Yet a further object of this invention is to provide a grounding apparatus for water treating equipment that more effectively removes older formed scale deposits adhering to the inner surfaces of such equipment, such as below its waterline.

Still another object of this invention is to provide an apparatus of this nature and which is so effective in operation that it minimizes substantially the maintainence and operating service and cost normally required in the prolonged usage of such equipment.

Yet another object of this invention is to provide an apparatus for removal of electrolytic energy from fluids, and due to its unique construction can be made to considerable length, due to the coupling of multiple sections of the apparatus together, so as to provide and greater facilitate the computed length of apparatus required for handling charge grounding in direct relation to the size of the water handling equipment being treated.

These and other objects will become more apparent to those skilled in the art upon reviewing the summary of this invention, and upon undertaking a study of the description of its preferred embodiment in view of the drawing.

SUMMARY OF THE INVENTION

This invention is designed to further enhance the usage and application of grounding devices within water handling equipment so as to remove more efficiently the electrostatic or electrolytic charge normally inhereit within many of these fluids, such as water, being processed. As is known, the essence of this type of invention is to provide for the disposition of a better electrolyte, than the water, within such water handling equipment, so that the mineral salts or trace minerals will not be electrolytically transferred and adhered by means of electric charge to the contact surfaces within such water handling equipment. Rather, the charge will be grounded by means of the grounding apparatus of this invention, thereby eliminating the vehicle normally furnishing such mineral conveyance through the water. More significantly, the improvement of this particular invention is the provision of further means upon such apparatuses and which stimulates the greater flow of water around the conductive member, in order to assure that electrolytic and electrostatic charge grounding effectively take place, and thereby increase the efficiency of operation of such water handling equipment, and to assure that the mineral or other deposits within the water will flow entirely through the apparatus, and not be adhered to its conductive surfaces, or within the conveyance means connecting therewith.

More specifically, this invention contemplates the arrangement of helically wound rod means around the external surface of the conductive member or probe formed of this apparatus, to insure that greater surface area is provided for contacting with the water flowing through the apparatus, and in addition, to provide for some circulation for the water passing by the probe which effectively achieves intermixing of the water thereat, and to assure that more efficient and effective grounding of the electrostatic charge takes place.

In another embodiment, and which is designed to provide for greater precision in the application of these apparatuses within water handling equipment, and to assure that removal of electrolytic energy takes place, the apparatus is designed for coupling through attachment of multiple of its segments together, the number of segments being determined by the size of the water handling equipment being subjected to this treatment. For example, the standard single lay-in unit as shown in my earlier U.S. Pat. No. 4,147,607, is generally designed for handling water handling equipment and the capacity of 25 ton, or that which has been operated to a 50,000 BTU capacity. In this current invention, means are provided at the end of the tube means forming the lay-in conductive member to provide for coupling of additional of these sections together, so that, as for example, should the water handling equipment to be treated have a 75 ton capacity, then three such sections of the tube formed conductive member of this invention may be coupled together for assuring maximum efficiency in the removal of electrolytic charge from the water being treated by this invention, and passing through the water handling equipment during its routine usage.

BRIEF DESCRIPTION OF THE DRAWING

In the drawings, FIG. 1 provides an isometric view of the probe-style conductive member of this invention;

FIG. 4 discloses the lay-in unit of this invention disposed within a water cooling tower, or the like;

DESCRIPTION OF THE PREFERRED EMBODIMENT

Figure 1:
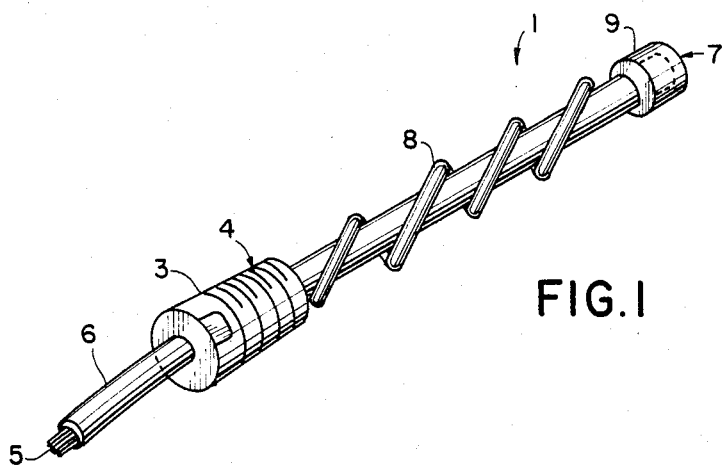
Figure 2:
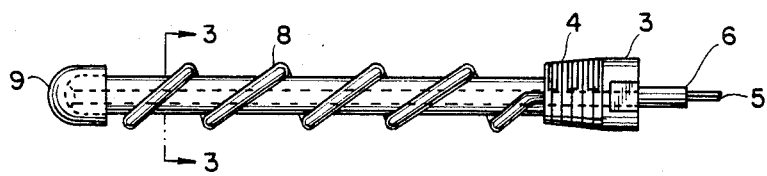
FIG. 2 provides a side view thereof.
Figure 3:
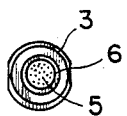
FIG. 3 provides a back view thereof.

In referring to the drawing, and in particular FIG. 1, there is disclosed the grounding apparatus 1 of this invention which incorporates a conductive member 2 which in this particular instance comprises a rod, as shown, extending for some length, and which when incorporated within and connected to the wall of the water handling equipment, extends for some distance therein so as to assure adequate exposure and contact with the water flowing through such equipment. The conductive member 2 has connected to one end a mounting means 3 which in this particular instance comprises a nonconductive material formed of means that threadedly engages, by means of the threads 4, to the liner or jacket of the vessel of the water handling apparatus. As can also be seen, a conductor 5 carrying its insulation 6, extends into and through the mounting means 3, and in the preferred embodiment, as can be determined from my earlier patent, the conductor 5 extends for the full length through the conductive member 2, and is generally connected by means of brazing, or the like, to the inserted end, as at 7, of the grounding apparatus. The improvement of this invention incorporates a rod-like member 8, which is also formed of conductive material, such as bronze, copper, or brass, similar to the materials from which the conductive member 2 is formed, with the rod-like member 8 projecting upwardly from the surface of the member 2, and extending longitudinally thereof, as can be seen. In the preferred embodiment, the projecting member 8 in the form of the rod is helically wound around the outer surface of the conductive member 2, proximate that end near where it connects into the mounting means 3, and extending forwardly towards the front tip 7 of the said member. So that the conductive member does not contact or become grounded itself at its forwardmost end, where it inserts within a vessel, a cap of nonconductive material 9 may be mounted onto this proximate end of the grounding apparatus.

In the said embodiment, and to provide relative size proportions, the conductive member may be a hollow tube having an outside diameter of ½" to ¾" diameter, while the rod wound thereon may be of a 3/16" dimension.

As stated, the conductive member of this invention, that member 2, in addition to its projecting member 8, are both formed of conductive material, such as copper, brass, bronze, or the like, and may be soldered or otherwise brazed together so as to assure conductivity between said components. On the other hand, the mounting means 3 and the cap 9 securing at the opposite ends of the conductive member, may be formed of any non-conductive polymer material, such as a fluoro plastic or of any other related type of resins or species thereof in the category of polytetrofluoroethylene, polychlorotrifluoroethylene, polyvinylidinefloride, or any chloro or fluorohydrocarbon. In addition, fluorinated ethylenepropylene resin, may also be useful for providing a strengthened and rigid polymer means that may function as the retaining means or mounting means, of this invention.

The probe means of this invention is generally designed for inserting within the vessel-style of water handling apparatus, such as the hot water heater, the dish/bottle washer, or related type of equipment. The relationship of the helical projecting means, or rod 8, upon the surface of the conductive member 2, is not designed to cause turbulence at this location, since the formation of any turbulence and its incident formed aeration may lessen the contact of water with the surface of the probe, as extending within the vessel. But, the design of the helically wound rod about the surface of the conductive member is intended to enhance the surface contact of the probe with a greater quantity of water passing through the water handling equipment, and in this manner, assure that maximum and efficiency in grounding of electrostatic charge out of the water effectively takes place, to enhance and sustain life of operation of the water handling equipment in which this invention mounts. Generally, the style of probe grounding apparatus as shown in FIG. 1 effectively works within a water handling vessel of the capacity of 30 gallons to 1000 gallons.

Figure 4:
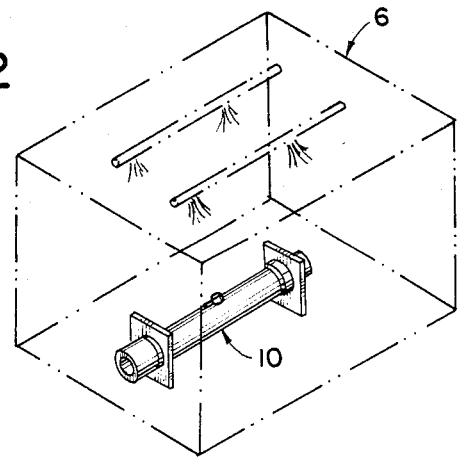
Figure 5:
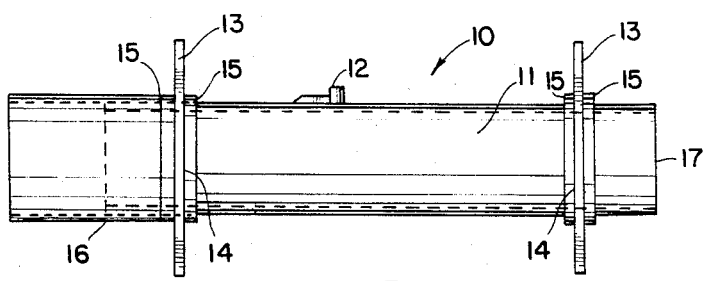
FIG. 5 shows a side view of the lay-in unit of this invention as disclosed in FIG. 4.
Figure 6:
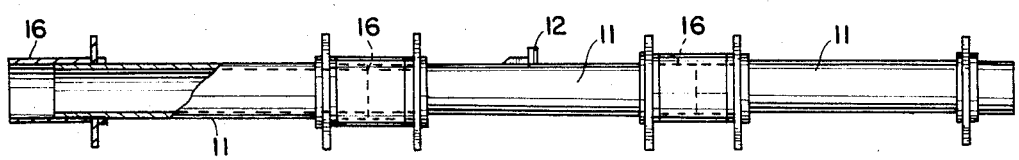
FIG. 6 shows the coupling of at least three of the lay-in units of this invention secured together for application within water handling equipment.

The further usage of this invention in its modified form is shown in FIGS. 4 through 6, and herein comprises the lay-in style of grounding apparatus 10 that is located within a cooling tower, such as the cooling tower C as shown. In this invention, the grounding apparatus or more particularly its conductive member formed of the tube 11 is generally open through its interior, and which tube may be formed of copper, brass, or other conductive material. Proximate the midpoint of the tube is provided a lug 12, and which also may be formed of copper or other conductive metal, and which is integrally secured as by brazing to the surface of the tube 11. A grounding cable, not shown, connects onto the lug 12 and is extended out of the cooling tower, or other water handling equipment, in which this lay-in unit may be enclosed, and said cable extends to another location where it is effectively mounted to ground. Proximate each end, or near each end, of the tube 11 there is provided a mounting means 13 which in this particular instance comprises a pair of flattened sheets of fluoroplastic, such as one made of Teflon, or the like, and which sheet includes an aperture, as at 14, and which allows for the support to be slidingly inserted onto the tube 11, and to support it spacedly off of any surface upon which the lay-in unit rests. In this manner, the apparatus functions as a source for grounding of any of the electrostatic charge that is prevalent within the water contained or passing through the tower C. Also upon each proximate end of the tube 11 of the conductive apparatus of this invention is a ring-like member 15 that may be formed of the same material as the tube 21, or otherwise, and then slipped onto the proximate end of said tube, and brazed or otherwise tightly secured in place. The reason for the installation of such rings is to function as a base for holding of the supports 13 in place, and to prevent their untimely removal from this grounding apparatus. The external diameter of these rings 15 are greater than the internal diameter of the aperture 14 provided through each support 13, even though the internal diameter of the apertures 14 is greater than the outside diameter of the tube 11, so as to provide for the easy sliding of the supports onto the tube 11.

Further provided upon the tube 11 of this invention is a sleeve 16 and which may be tightly adhered to one end of the tube 11, as shown, and abut up against the contiguous rings 15, and for reasons which will be subsequently described. Or, in the alternative, there need not be the contiguous ring 15 for use for holding the support 13, but rather, the sleeve 16 itself may rest proximate the adjacent edge surface of the support 13, and thereby firmly hold it in place. The function of this sleeve, and which is designed for mounting upon the external surface of the tube 11, is to furnish a coupler which functions to hold a series of these grounding apparatuses together, as can be seen in FIG. 6. As disclosed, three such grounding apparatuses of this invention, of this lay-in type, are secured together, and can function to effectively remove electrostatic charge from within a cooling tower, or other larger piece of water handling equipment and which has a much greater capacity than the boilers, hot water heaters, or related type of equipment as previously explained, and in which the probe-style of unit 1 will normally insert. The location of the sleeves 16 at one end, the left end as disclosed herein, upon the tubes 11, allows the opposite end, such as the end 17, to be inserted within the adjacent sleeve 16, to provide for a mounting of a series of these tube-type grounding units together. As previously explained, it has been found, through calculations, that one such lay-in style of grounding apparatus, such as shown in FIG. 5, can generally handle the effective grounding of electrostatic charge from an item of water handling equipment that is in the capacity of 25 tons, or operating at the range of 50,000 BTUs. On the other hand, where much larger type of water handling equipment is involved, as for example where the unit may be of a 75 ton capacity, then three such sections of grounding apparatuses 11 may be linked together, through their coupling within the sleeves 16, to provide for greater surface area of the grounding apparatus for exposure to the fluids or water passing through such enlarged equipment to assure that proper grounding of charge takes place. Obviously, when these units are linked together, in the manner as shown in FIG. 6, the sleeves 16 likewise will be formed of conductive material, generally similar to that from which the tubes 11 are fabricated, such as brass, copper, or the like, so as to assure that full conductivity can take place between tube sections, and achieve effective grounding through the inter connection of a cable (not shown) to the lug 12 of the centerally disposed grounding unit.

In operation, as generally referred to herein, the probe-style of unit 1, as shown in FIG. 1, will be threadedly engaged within an aperture formed through the wall of the vessel of an item of water handling equipment, such as a hot water heater, or the like. On the other hand, the lay-in style of unit 10, as shown in FIG. 5, will rest within or upon the surface of a much larger type of water handling equipment, such as the cooling tower C, as shown. And, depending upon the size of the cooling tower, one or more of such units 10 may be coupled together, in the manner as shown in FIG. 6, so as to handle the grounding of electrostatic charge from within these larger style of items of water handling equipment. Thus, as can be seen from review of this particular invention, as described herein, water handling equipment of any size can be covered and effectively grounded through the application of the tube modified forms of grounding apparatuses shown and explained herein, and achieve the type of grounding of charging necessary so as to eliminate, fully, as has occurred in practice, of any mineral deposits within or upon the surface of the vessel of the water handling equipment, or any of the tubes or other means of conveyances connecting therewith.

Various modifications or changes may be made by those skilled in the art to the invention described herein upon reviewing the subject matter of this disclosure. Such modifications or changes, if within the spirit of this invention, are intended to be encompassed within the scope of any claims to patent protection issuing hereon. The description of the preferred embodiment set forth herein is done so for illustrative purposes only.

Having thus described the invention what is claimed and desired to be secured by Letters Patent is:

1. An apparatus for stimulating removal of electrolytic energy from a vessel of water or other charge conveying liquid, said apparatus including a conductive member provided for disposition within the vessel and below its waterline, a conductor electrically connecting with said conductive member and provided for extending externally of any vessel in which the said member is disposed, said conductor capable of being grounded, a nonconductive mounting means secured with the conductive member and disposed for electrically insulating the said member from the vessel in which it is disposed, said mounting means being nonabsorbent of moisture and free of electrical conductivity even after its sustained submersion in water within the vessel, a projecting means mounted upon the conductive member and extending substantially along its length from its connection with the mounting means and to its most inwardly disposed end within the vessel, whereby the said conductive member and its projecting means retains an electrically isolated state with respect to the vessel in which it mounts and is capable of conducting electrostatic charge from the water located in any such vessel.

2. The invention of claim 1 and wherein said projecting means extends along the length of the conductive member.

3. The invention of claim 2 and wherein said projecting means being helically wound along the length of the said conductive member.

4. The invention of claim 1 and wherein said projecting means comprises a rod member connecting along the length of the conductive member.

5. The invention of claim 4 and wherein said rod member is helically wound along the length of the said conductive member.

6. The invention of claim 5 and further including a cap means mounting onto the inwardmost disposed end of the conductive member as extending within the said vessel, said cap means being nonconductive of electrostatic charge.

7. The invention of claim 5 and wherein said electrically nonconductive mounting means is formed of a fluoroplastic.

8. The invention of claim 5 and wherein said electrically nonconductive mounting means is formed of polytetrofluoroethylene.

9. The invention of claim 5 and wherein said electrically nonconductive mounting means is formed of polyfluorotrifluoroethylene.

10. The invention of claim 5 and wherein said electrically nonconductive mounting means is formed of polyvinylidinefloride.

11. The invention of claim 5 and wherein said electrically nonconductive mounting means is formed of chloro or fluorohydrocarbon.

12. The invention of claim 5 and wherein said electrically nonconductive mounting means is formed of fluorinated ethylenepropylene resin.

13. The invention of claim 4 and wherein said mounting means incorporates a series of threads for retention of said apparatus to the vessel.

14. An apparatus for stimulating removal of electrolytic energy from a vessel of water or other charge conveying liquid, said apparatus including a conductive member provided for disposition within the vessel and below its waterline, a conductor electrically connecting with said conductive member and provided for extending externally of any vessel in which the said member is disposed, said conductor capable of being grounded, a nonconductive mounting means secured with the conductive member and disposed for electrically insulating the said member from the vessel in which it is disposed, said mounting means being nonabsorbent of moisture and free of electrical conductivity even after its sustained submersion in water within the vessel, said conductive member comprising a length of tube of electrically conductive material, said mounting means comprising a pair of supports, each support having an aperture therein and disposed for reception of the conductive member tube therethrough, one of each support arranged proximate to an end of the tube in order to provide stable support of the tube within the vessel, and to insulatingly space the said tube from the vessel in which it rests, and said tube at one end incorporating a sleeve being mounted thereon, and said sleeve provided for accommodating the insertion of an additional tube therein for a series connection of more than one tube style conductive members together for use for stimulating the removal of electrolytic energy from the vessel in which the apparatus rests.

15. The invention of claim 14 and wherein each support is arranged proximate an end of the tube.

16. The invention of claim 15 and including a series of rings provided upon the tube and disposed for retention of the supports upon the said tube.

17. The invention of claim 15 and including a lug provided upon the tube disposed for connection with the conductor to furnish an electrical grounding for the said conductive member tube.

* * * * *